United States Patent
Weinberg et al.

(10) Patent No.: US 9,138,943 B2
(45) Date of Patent: Sep. 22, 2015

(54) COMPOSITE SHEET MATERIAL AND METHOD FOR FORMING THE SAME

(75) Inventors: Martin Weinberg, New Canaan, CT (US); James Yuan, Westport, CT (US); Robert Markowski, Wallingford, CT (US)

(73) Assignee: XAMAX INDUSTRIES, INC., Seymour, CT (US)

(*) Notice: Subject to any disclaimer, the term of this patent is extended or adjusted under 35 U.S.C. 154(b) by 346 days.

(21) Appl. No.: 13/605,598

(22) Filed: Sep. 6, 2012

(65) Prior Publication Data

US 2014/0062126 A1    Mar. 6, 2014

(51) Int. Cl.
*B32B 37/04* (2006.01)
*B29C 70/46* (2006.01)
*B32B 5/02* (2006.01)
*B32B 27/12* (2006.01)
*B29C 70/08* (2006.01)
*B32B 33/00* (2006.01)
*B29K 101/12* (2006.01)

(52) U.S. Cl.
CPC ............. *B29C 70/465* (2013.01); *B29C 70/086* (2013.01); *B32B 5/024* (2013.01); *B32B 27/12* (2013.01); *B32B 33/00* (2013.01); *B29K 2101/12* (2013.01); *B32B 2260/02* (2013.01); *B32B 2260/046* (2013.01); *B32B 2307/3065* (2013.01); *B32B 2307/71* (2013.01); *Y10T 428/24* (2015.01); *Y10T 428/24802* (2015.01); *Y10T 428/24942* (2015.01); *Y10T 442/66* (2015.04); *Y10T 442/662* (2015.04); *Y10T 442/674* (2015.04); *Y10T 442/675* (2015.04); *Y10T 442/678* (2015.04)

(58) Field of Classification Search
USPC ....................................... 428/195.1
See application file for complete search history.

(56) References Cited

U.S. PATENT DOCUMENTS

| | | | |
|---|---|---|---|
| 3,382,908 A | 5/1968 | Palmquist et al. |
| 3,616,176 A | 10/1971 | Jachimowicz |
| 4,202,663 A | 5/1980 | Haigh et al. |
| 4,217,434 A | 8/1980 | Koeble |

(Continued)

FOREIGN PATENT DOCUMENTS

| | | |
|---|---|---|
| DE | 102010050872 A1 | 5/2012 |
| EP | 1902830 A1 | 3/2008 |

(Continued)

OTHER PUBLICATIONS

Non-Final Office Action, U.S. Appl. No. 14/266,421, dated Nov. 3, 2014, 17 pages.

(Continued)

*Primary Examiner* — Bruce H Hess
*Assistant Examiner* — Christopher Polley
(74) *Attorney, Agent, or Firm* — Baker & McKenzie LLP (57) ABSTRACT

A composite sheet material and method for forming the same is provided that includes a substrate, a matrix, and a cover sheet. The substrate has a first face surface, a second face surface, and a plurality of edges, and includes a thermoplastic material. The matrix is attached to the substrate. The matrix includes a support component having a first melting point, and a thermoplastic component having a second melting point. The second melting point is less than the first melting point. The cover sheet imparts one or more surface characteristics to the composite sheet material during thermo-pressure formation of the composite sheet material.

33 Claims, 2 Drawing Sheets

(56) References Cited

U.S. PATENT DOCUMENTS

| | | |
|---|---|---|
| 4,255,217 A | 3/1981 | Franze |
| 4,409,280 A | 10/1983 | Wiley et al. |
| 4,714,650 A | 12/1987 | Obayashi et al. |
| 4,746,560 A | 5/1988 | Goeden |
| 5,194,462 A * | 3/1993 | Hirasaka et al. ............... 524/13 |
| 5,474,620 A | 12/1995 | Nath et al. |
| 5,824,178 A * | 10/1998 | Shingu et al. ............... 156/265 |
| 6,287,678 B1 | 9/2001 | Spengler |
| 7,829,165 B2 | 11/2010 | Grandominico et al. |
| 7,887,120 B2 | 2/2011 | Boivin et al. |
| 7,942,469 B2 | 5/2011 | Boivin et al. |
| D649,090 S | 11/2011 | Boivin et al. |
| 2001/0046590 A1 | 11/2001 | Benton et al. |
| 2002/0132960 A1 | 9/2002 | Haile et al. |
| 2002/0168503 A1 | 11/2002 | Dong et al. |
| 2006/0252334 A1 | 11/2006 | LoFaro et al. |
| 2008/0230938 A1 | 9/2008 | Grefenstein et al. |
| 2010/0151760 A1 | 6/2010 | Laura, Jr. et al. |
| 2013/0142988 A1 | 6/2013 | Grelin |
| 2013/0236688 A1 | 9/2013 | Stamp et al. |

FOREIGN PATENT DOCUMENTS

| | | |
|---|---|---|
| EP | 2599614 A1 | 6/2013 |
| WO | 0051799 A1 | 9/2000 |
| WO | 2008/034543 A1 | 3/2008 |

OTHER PUBLICATIONS

Non-Final Office Action, U.S. Appl. No. 14/266,428, dated Nov. 3, 2014, 17 pages.
International Search Report and Written Opinion, PCT/US2014/053816, dated Nov. 18, 2014, 11 pages.
International Search Report and Written Opinion, PCT/US2013/058540, dated Nov. 29, 2013, 11 pages.
Final Office Action, U.S. Appl. No. 14/266,421, dated Mar. 27, 2015, 18 pages.
Non-Final Office Action, U.S. Appl. No. 14/266,441, dated Jan. 15, 2015, 8 pages.
Final Office Action, U.S. Appl. No. 14/266,428, dated Jan. 27, 2015, 9 pages.
Non-Final Office Action, U.S. Appl. No. 14/020,488, dated May 20, 2015, 34 pages.

* cited by examiner

100% of the previous output is re-used here...

COMPOSITE SHEET MATERIAL AND METHOD FOR FORMING THE SAME

BACKGROUND OF THE INVENTION

1. Technical Field

This invention relates generally to composite sheet materials that include a nonwoven or woven fabric and a thermoplastic material, to a method of forming the same, and to products that include such a composite sheet material.

2. Background Information

Composite materials that consist of a thermoplastic nonwoven material with a thermoplastic material are known in the public. The outer surface(s) of such composite products, however, typically have poor scratch resistance, poor abrasion qualities, poor stain resistance, and poor color brilliance, are difficult to adhere to, have undesirable appearance characteristics (e.g., uneven surface finish), and do not accept pigment or print well.

It would, therefore, be desirable to have a composite product that overcomes the above shortcomings and provides additional enhancements.

SUMMARY OF THE INVENTION

According to an aspect of the present invention, a composite sheet material is provided that includes a substrate, a matrix, and a cover sheet. The substrate has a first face surface, a second face surface, and a plurality of edges, and includes a thermoplastic material. The matrix is attached to the substrate. The matrix includes a support component having a first melting point, and a thermoplastic component having a second melting point. The second melting point is less than the first melting point. The cover sheet imparts one or more surface characteristics to the composite sheet material during thermo-pressure formation of the composite sheet material.

According to another aspect of the present invention, a method of forming a composite sheet material is provided. The method includes the steps of: a) providing a substrate having a first face surface, a second face surface, and a plurality of edges, and which substrate includes a thermoplastic material; b) forming a matrix from a sheet of a support component and a sheet of a thermoplastic component, wherein the support component has a first melting point and the thermoplastic component has a second melting point, and the second melting point is less than the first melting point; c) positioning the substrate and the matrix such that the matrix is contiguous with the first face surface of the substrate; and d) laminating the substrate and matrix together in a thermo-pressure process to form the composite sheet material.

According to another aspect of the present invention, a method of forming a composite sheet material is provided. The method includes the steps of: a) providing a substrate having a first face surface, a second face surface, and a plurality of edges, and which substrate includes a thermoplastic material; b) forming a matrix by extruding a multilayer thermoplastic component onto a support component, wherein the support component has a first melting point and the thermoplastic component has a second melting point, and the second melting point is less than the first melting point; c) positioning a sheet of the substrate and a sheet of the matrix such that the matrix is contiguous with the first face surface of the substrate; and d) laminating the substrate and matrix together in a thermo-pressure process to form the composite sheet material.

According to another aspect of the present invention, a composite sheet material matrix is provided that includes a support component and a thermoplastic component. The support component has a first melting point. The thermoplastic component has a plurality of layers. The thermoplastic component has a second melting point, and the second melting point is less than the first melting point.

According to another aspect of the present invention, a composite sheet material is provided that includes a substrate and a matrix. The substrate includes a first face surface, a second face surface, a plurality of edges, and a thermoplastic material. The matrix is attached to the substrate. The matrix includes a support component having a first melting point, a thermoplastic component having a second melting point, and a secondary thermoplastic component having a third melting point. The second melting point is less than the first melting point. The third melting point is equal to or greater than the first melting point.

According to another aspect of the present invention, a side skirt assembly adapted to be mounted to a tractor trailer is provided. The side skirt assembly includes a support frame and a side skirt panel. The support frame is configured for attachment to the tractor trailer. The side skirt panel is attached to the support frame. The side skirt panel is a composite sheet material that has a length and a width. The composite sheet material includes a substrate, a matrix, and a cover sheet. The substrate includes a thermoplastic material. The matrix is attached to the substrate. The matrix includes a support component having a first melting point, and a thermoplastic component having a second melting point, and the second melting point is less than the first melting point. The cover sheet is configured to impart one or more surface characteristics to the composite sheet material during a thermo-pressure formation of the composite sheet material. The side skirt assembly is configured so that the width of the side skirt panel is substantially vertically positionable on a side of the tractor trailer, and the length of the side skirt panel extends along the length of the tractor trailer.

According to another aspect of the present invention, a panel for a tractor trailer box container having a frame is provided. The panel includes a composite sheet material and has a length and a width. The composite sheet material includes a substrate, a matrix, and a cover sheet. The substrate includes a thermoplastic material, and the matrix is attached to the substrate. The matrix includes a support component having a first melting point, and a thermoplastic component having a second melting point, and the second melting point is less than the first melting point. The cover sheet is configured to impart one or more surface characteristics to the composite sheet material during a thermo-pressure formation of the composite sheet material. The composite sheet material panel is configured for attachment to the frame of the tractor trailer box container frame.

These and other objects, features and advantages of the present invention will become apparent in light of the detailed description of the invention provided below, and as illustrated in the accompanying drawings.

DESCRIPTION OF THE INVENTION

Figure 1:
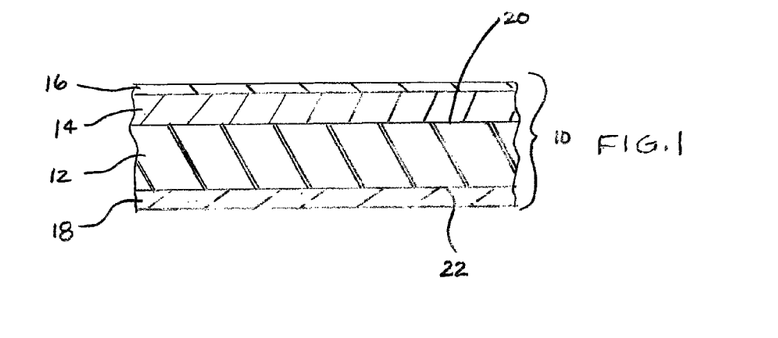
FIG. 1 is a diagrammatic view of an embodiment of the present composite sheet material, including a backing layer and a cover sheet.

Referring to FIG. 1, the present composite sheet material 10 includes a substrate 12 and a matrix 14, and in some embodiments a cover sheet 16 and a backing layer 18.

The substrate 12 can be formed as a sheet product having a first face surface 20, a second face surface 22, and a plurality of edges. The substrate 12 includes one or more thermoplastic materials such as, but not limited to, polypropylene (PP), polylactic acid (PLA), polyethylene terephthalate (PET), polybutylene terephthalate (PBT), polyethylene (PE), polyamide (PA), Polyphenylene ether/oxide (PPO), Polycarbonates (PC), Polyphenylene sulfide (PPS), Acrylonitrile butadiene styrene (ABS), polyvinyl chloride (PVC), Polyoxymethylene ("POM"), or "Acetal", or as the DuPont product Delrin®), and copolymers thereof, typically in fiber or strand or extruded form. The substrate may also include (e.g. have an internal or external layer of) thermoset materials such as unsaturated polyesters, epoxy, vinyl esters, polyurethanes, phenolic, silicones, melamine, polystyrene. The substrate 12 may also include non-thermoplastic materials such as cotton, wood pulp, rayon, bagasse, phenolic, wool, fiberglass, flax, bamboo, carbon fiber, aramid, etc., and combinations thereof, also typically in fiber, chopped fiber, woven, stitched, braided or continuous strand form; e.g., for reinforcing purposes, etc. Materials within the substrate 12 may be made in a woven or non-woven form, or using random laid fibers. In those embodiments where the substrate 12 is nonwoven, the substrate 12 can be made using wetlaid, pointbond, spunbond, spunlace, airlaid, needle punched or meltblown processes, or thermal bond processes, or combinations thereof. The substrate 12 may include a single layer of a material, or may be fowled of multiple layers of the same material, or multiple layers of more than one type of material. The substrate 12 may include one or more additives, including those that function as ultraviolet (UV) inhibitors and thermal stabilizers, those that make the substrate fire-resistant, and other additives such as pigments, wetting agents, anti-microbial agents, hydrophilic agents, and hydrophobic agents. The substrate 12 may also include one or more additives, including those that function as ultraviolet (UV) inhibitors and thermal stabilizers, those that make the composite sheet material 10 fire-resistant, and other various additives such as pigments, silicones, additives that improve stain resistance and cleanability (e.g., PTFE and other fluoropolymers), wetting agents, anti-microbial agents, anti-gas fade agents (e.g., chemical resistance agents), hydrophilic agents, hydrophobic agents. In those embodiments where a portion, or all, of the substrate 12 is extruded, the substrate 12 may also include process aids to improve extrusion surface uniformity. The substrate 12 may also include one or more of the following additives: biodegradable additives, grease resistant additives, antioxidant additives, slip agents, additives to minimize or eliminate static electricity, and conductive and/or semiconductive particles or fibers. The characteristics (e.g., fire-resistance, UV inhibitors, etc.) of the various additives and components described above as potential constituents within the substrate 12, are not limited to the substrate 12, but may also be described as being a part of the composite sheet material 10 of which the thermoplastic component is a portion. The substrate 12 is not, however, limited to these additives.

The materials used to create the substrate 12 may be arranged in particular orientations to give the substrate 12 desirable mechanical characteristics. For example, in those substrate 12 embodiments that utilize fibrous materials, the fibers can be oriented to provide desirable stiffness, impact resistance, flexibility, etc. In those substrate 12 embodiments that include more than one layer, the content and orientation of the different layers can be also selected and arranged to enhance the mechanical characteristics; e.g., thermoplastic materials that enhance the impact resistance, flex strength, and/or tensile strength of the substrate 12, and glass or other reinforcing fibers that enhance the stiffness of the substrate 12.

The matrix 14 is attached to first face surface 20 of the substrate 12. The matrix 14 includes a woven or nonwoven support component 24 and a thermoplastic component 26. In some embodiments, the matrix includes a secondary thermoplastic component 27.

The support component 24 substantially consists of a primary material (or combination of materials) having a melting point, and for purposes of describing the present invention the support component 24 will be described as having a melting point equal to that of the primary material. As will be described below, the thermoplastic component 26 has a melting point which is lower than the melting point of the support component 24. An example of an acceptable material for the support component 24 is a nonwoven polyester (which has a melting point in the range of approximately 250-300 degrees centigrade; 250° C.-300° C.) formed by a spun bond process. The support component 24 is not limited to polyester, and can be formed from a variety of materials having a melting point that is higher than that of the thermoplastic component 26. In those embodiments where it is desirable to have a composite sheet material 10 with a flat exterior surface, the support component 24 may be formed using a spunlace or needled nonwoven process that utilizes fibers that are short; e.g., relative to continuous fibers used in a spun bond process. In the spunlace process, fibers are spun and then directly dispersed into a web by deflectors or can be directed with air streams. Prior art techniques for consolidating fibers in a web include mechanical bonding, which entangles the fibers to give strength to the web. Well-known mechanical bonding techniques for creating bonded nonwovens include needlepunching and hydroentanglement. The latter uses highspeed jets of water to strike a web so that the fibers knot about one another. Needlepunching is a similar process that uses mechanical needles perforating the web to create the desired knotted fiber structure. In some instances (i.e., the spunbonding technique), synthetic polymers are extruded into filaments and directly formed into webs which selfbond under elevated heat and/or pressure to produce the final fabric. In other instances, the fibrous web is fluid rearranged and then resin binder may be added to form a useful, coherent nonwoven fabric. The shorter fibers typically result in a flatter surface than might be produced in a process using longer fibers (e.g., a spunbond process that utilizes continuous fibers that are point bonded). The terms "flat" or "flatness" are used herein to describe the quality of surface as being an even surface without risings or depressions. With the acknowledgement that no surface is perfectly flat, the terms "flat" and "flatness" may be used herein to refer to the relative amount of risings and/or depressions in a surface; e.g., embodiments of the present composite surface, as described herein, can be formed to have a flatness that is greater than similar prior art composites, and in many instances will appear perfectly flat to the naked eye. The shorter fibers provide desirable uniformity and also provide better resistance to delamination, due to the omnidirectional orientation of the fibers (e.g., oriented in any of the X, Y, and Z axes, and combinations thereof). The continuous fibers used within a spun bond process tend to extend predominantly within a single plane (e.g., X-Y plane) and consequently are more susceptible to delamination under certain circumstances. The support component 24 is not limited to any particular formation process, however. Alternatively, the support component may take the form of an apertured fabric (sometimes referred to as "perforated fabric"). An apertured nonwoven web may be formed by passing an unbonded fiber web through a nip formed by a set of intermeshing rolls which have three-dimensional projections to displace fibers away from the projections, forming apertures which conform to the outside contours of the base of the projections in the web. The apertured web is subsequently bonded to impart permanent physical integrity. A person of skill in the art will recognize, however, that apertured nonwovens may be made by other processes as well. An advantage of using an apertured nonwoven is that it can provide a superior bonding surface within the matrix due to additional surface area provided by the apertures. The support component 24 may also be formed using fibers that are pretreated, coated, or saturated with a binder to provide the support component with desirable properties. Alternatively, the fibers within the nonwoven may be subsequently treated, coated or saturated with the binder to provide the aforesaid desirable properties. Non-limiting examples of such a binder include a polyurethane (e.g., BASF Astacin®), butadiene (e.g., BASF Luron®), or an acrylic that is a dispersion mainly of polyacrylic and polymethacrylic esters, usually produced by radical initiated emulsion polymerization of the unsaturated monomers (e.g., Celanese Emulsions Nacrylic® 217A, which is a self-crosslinking acrylic polymer emulsion, or Celvol 523) can be used to further enhance adhesion and strength. The embodiments of the support component 24 that use a binder are not, however, limited to these examples. In some embodiments, the support component 24 may also be calendered to increase the density and flatness of the support component 24, and/or to facilitate bonding of the fibers together to increase the support component's resistance to delamination.

Examples of acceptable support component 24 materials include, but are not limited to, polyester (PET or PBT), nylon (Polyamide), polyphenylsulfide (PPS), aromatic polyamide (both meta aramid and para aramid), fiberglass, PTFE, wool, carbon fiber, Alumina/Silica, polyimide, polypropylene, polyethylene, cellulose, rayon, and viscose, or combinations thereof.

The thermoplastic component 26 substantially consists of, but is not limited to, configurations of the following materials (and co-polymers thereof) having a melting point lower than that of the support component 24 material: polypropylene (PP), polyethylene (PE), polyethylene terephthalate (PET), low-density polyethylene (LDPE), polyurethane (PU), polyamide (PA), polyamide-imide (PAI), ionomer (e.g., Surlyn®, Surlyn Reflections®—which is an ionomer with a polyamide—, etc.), acrylic, metallocenes (i.e., a type of thermoplastic material), etc. The higher melting point of the support component 24 material allows the thermoplastic component 26 to melt and at least partially migrate through the support component 24 without the support component 24 melting during the initial formation of the matrix (and in some embodiments also migrate through and into contact with the substrate 12 when the substrate 12 and the matrix 14 are joined to one another under an elevated heat and pressure process). Consequently, the support component 24 helps to define the matrix 14 relative to the substrate 12. Note that certain polymers may be available in a plurality of different forms, and collectively they may have a wide range of melting points. In some instances, it may be possible to use a first variation of a particular thermoplastic material for the support component 24 and a second variation of the same thermoplastic material for the thermoplastic component 26, provided the two variations have sufficiently different melting points. The thermoplastic component 26 may also include one or more additives, including those that function as ultraviolet (UV) inhibitors and thermal stabilizers, those that make the composite sheet material 10 fire-resistant, and other various additives such as pigments, silicones, additives that improve stain resistance and cleanability (e.g., PTFE and other fluoropolymers), wetting agents, anti-microbial agents, anti-gas fade agents (e.g., chemical resistance agents), hydrophilic agents, hydrophobic agents. In those embodiments where a portion, or all, of the thermoplastic component 26 is extruded, the thermoplastic component 26 may also include process aids to improve extrusion surface uniformity. The thermoplastic component 26 may also include one or more of the following additives: biodegradable additives, grease resistant additives, antioxidant additives, slip agents, additives to minimize or eliminate static electricity, and conductive and/or semi-conductive particles or fibers. The characteristics (e.g., fire-resistance, UV inhibitors, etc.) of the various additives and components described above as potential constituents within the thermoplastic component 26, are not limited to the thermoplastic component 26, but may also be described as being a part of the composite sheet material 10 of which the thermoplastic component 26 is a portion.

Figure 2:
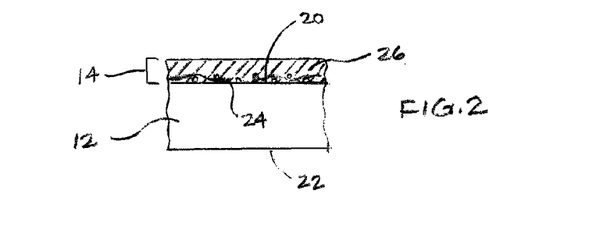
FIG. 2 is a diagrammatic view of an embodiment of the present composite sheet material, illustrating the sheet material after formation.

The thermoplastic component 26 may be applied to the support component 24 as a coating. The thermoplastic component 26 coating initially resides on a face surface of the support component 24, and/or may at least partially saturate the substrate 12 prior to the composite sheet material 10 formation processes (e.g., thermo-pressure lamination). The coating may be applied to the support component 24 using an extrusion process, or any other known process operable to apply the thermoplastic component 26 as a coating. In one example of an extrusion process, both the thermoplastic component 26 and the support component could be formed together in a single pass extrusion process. Alternatively, the thermoplastic component 26 may initially assume a sheet form disposed on one side of the support component 24. The one or more sheets of the thermoplastic component 26 may be joined (e.g., laminated) to the support component 24 to form the matrix, and subsequently the matrix 14 can be attached to the substrate 12. Alternatively, the support component 24 and the one or more sheets of the thermoplastic component 26 may be stacked together with the substrate 12, and all joined together simultaneously; e.g., in an elevated heat and pressure process. Post matrix or composite sheet formation, a sufficient amount of thermoplastic component 26 resides on the exterior surface 28 of the matrix 14 to form a substantially uninterrupted surface consisting of the thermoplastic component 26, and some amount of thermoplastic component 26 is in contact with the first face surface 20 of the substrate 12 as can be seen in FIG. 2.

Figure 3:
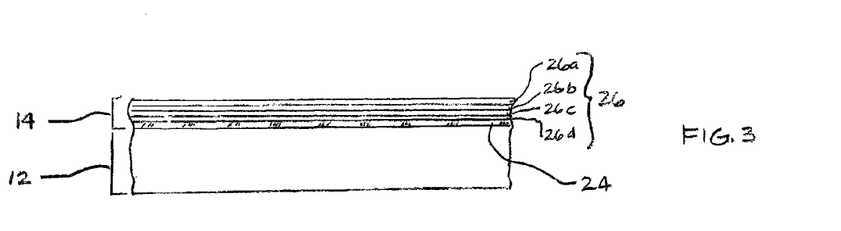
FIG. 3 is a diagrammatic view of an embodiment of the present composite sheet material, including a matrix having a multilayer thermoplastic component.

Regardless of its form (coating, sheet, etc.), the thermoplastic component 26 may assume a single layer, or may include a plurality of independent layers (e.g., see FIG. 3, where thermoplastic component layers are identified as 26a-26d). In those embodiments where the thermoplastic component 26 includes a plurality of different layers (e.g., multilayer extrusion, or a multilayer sheet, etc.), the material of the specific layers and their position within the stack up of layers can be selected to enhance one or more characteristics of the present composite sheet material 10; e.g., thermal, optical, barrier, surface appearance, and cost characteristics. For example, a multilayer thermoplastic component 26 can be chosen to enhance the surface characteristics of the matrix 14, and therefore the surface characteristics of the composite sheet material 10. The thermoplastic component 26 layers can be processed to provide the matrix 14 (and therefore the composite sheet material 10) with a flat or textured exterior surface 28 (e.g., a matte or dimpled surface, and/or a surface that includes three dimensional patterns, and/or one embossed with graphic patterns, etc.). Similarly, the material(s) of the thermoplastic component 26 can give, or be finished to give, the matrix 14 a flat non-gloss appearance, or a high-gloss appearance, or anything in between. The thermoplastic component 26 may also be configured to facilitate the deposition of characters or a design on the matrix 14 (e.g., the characteristics of the outer layer of the thermoplastic component 26 may be chosen to facilitate the printing), or the deposition of characters or a design within the matrix 14 (e.g., printing on a subsurface layer of the matrix 14 that is visible on the surface). The surface characteristics can be selected to suit the intended application of the composite sheet material 10. In some embodiments, one or more bonding materials operable to ensure bonding adhesion between the independent layers can also be included between the layers. A bonding layer may also be used to improve the bond to the support component 24, as well as the other side, if a cover sheet 16 is used.

The inclusion of thermoplastic materials in the matrix 14 of the present composite material sheet 10 provides desirable properties that make the present composite sheet material 10 a favorable component for many different applications. For example, the thermoplastic and support components of the present matrix provide the composite sheet material with excellent durability, formability, impact resistance, memory, cleanability, cosmetic improvement and toughness that is desirable in exterior applications where the composite sheet material 10 is subject to impacts, bending loads, and environmental constraints (e.g., sun, moisture, temperature variations, etc.).

An intermediate bonding agent may be used to facilitate bonding of the matrix 14 on to the underlying substrate 12. For example, maleic anhydride may be used as an additive to one or more of the components of the matrix to act as a bonding agent.

Figure 6:
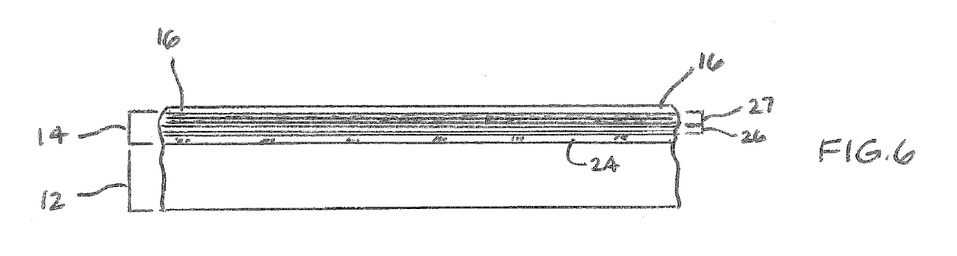
FIG. 6 is a diagrammatic view of an embodiment of the present composite sheet material including a matrix having a secondary thermoplastic material.

Referring to FIG. 6, in some embodiments the matrix 14 may include a secondary thermoplastic component 27. The secondary thermoplastic component 27 includes one or more sheets or layers of a thermoplastic material that has a melting point equal to or greater than the support component 24. Like the thermoplastic component 26, the secondary thermoplastic component 27 in the matrix 14 of the present composite material sheet 10 provides desirable properties that make the present composite sheet material 10 a favorable component for many different applications; e.g., providing desirable durability, formability, impact resistance, memory, and toughness.

In some embodiments, the present composite sheet material 10 includes a cover sheet 16 attached to the matrix 14. The cover sheet 16 may be attached in a manner that enables the cover sheet 16 to be readily removed; e.g., peeled off by the end user—see FIG. 4. In those embodiments where the cover sheet 16 is readily removable, one or both of the two surfaces that will be in contact when the cover sheet 16 is attached (i.e., either the exposed surface 28 of the matrix 14 or the opposing surface 30 of the cover sheet 16) are non-active, thereby permitting removal of the cover sheet 16 from the matrix 14 material by hand or machine; i.e., the non-active surface prevents significant bonding (or conversely allows a limited amount of bonding) between the two surfaces. A paper sheet product treated with a material such as Quilon® chrome complexes, commercially available from DuPont, is an example of a cover sheet 16 that can be lightly adhered and used as a removable cover sheet 16. Other acceptable treatments to create a non-active cover sheet surface include one or more wax type materials applied to the surface of the cover sheet 16, or a fatty acid ester release surface, silicone, etc. The present invention is not, however, limited to any particular treatment for creating a non-active cover sheet. A paper material cover sheet is advantageous relative to many materials for several reasons, including: 1) it will not appreciably shrink during the formation of the composite sheet material 10; 2), it can be preprocessed (e.g., by calendaring) to have a particular density and/or surface finish; and 3) paper is relatively inexpensive. Some plastic materials may shrink or otherwise distort when subjected to a lamination process. However, the cover sheet 16 may also be made from polymeric materials in a form that will not shrink appreciably or at all; e.g., cast films, pre-shrunk films (e.g., pre-shrunk biaxial oriented PET), etc. Other examples of an acceptable cover sheet 16 include those formed from one or more of paper (cellulosic, non-cellulosic, or other), polyamide (PA), polyphenylsulfone (PPSU), polyphenylsulfide (PPS), polyurethane (PU), polyethylene (PE), low-density polyethylene (LDPE), polyamide (PA), polyamide-imide (PAI), ionomer (e.g., sold by DuPont under the tradename of Surlyn® by DuPont), polycarbonate (PC), polyethylene terephthalate (PET), PBT, fluoropolymers (Polytetrafluoroethylene (PTFE), perfluoroalkoxy polymer (PFA), fluorinated ethylene-propylene (FEP); all of which are sold by DuPont under the tradename of Teflon® by DuPont). As indicated above, a cover sheet 16 made from any of these materials may be treated to facilitate its removal from the matrix 14. The cover sheet 16 is not, however, limited to these materials.

In some embodiments, the cover sheet 16 may comprise a shrinkable material (i.e., a material that dimensionally decreases to a dimensionally stable state). In such embodiments, the cover sheet 16 may be dimensionally decreased by the application of heat and/or pressure to arrive at the desired dimensions in a stable state during the process of forming the composite sheet material 10. A non-limiting example of an acceptable for material that can be used as a shrinkable cover sheet is biaxially oriented PET (e.g., Mylar®). A shrinkable cover sheet may be used in those embodiments where the cover sheet 16 is readily removed, or permanently attached as described below.

The removable cover sheet 16 can provide one or more desirable functions. For example, as will be described below, the composite sheet material 10 can be formed using a continuous or batch thermo-pressure manufacturing process wherein the composite sheet material 10 is subjected to elevated surface pressure and temperature to promote lamination between the components of the composite sheet material 10. During the lamination process (e.g., the matrix 14 formation process and/or the composite material sheet 10 formation process), the surface characteristics of the removable cover sheet 16 can impart surface characteristics to the exterior surface of the matrix 14 portion of the composite sheet material 10; e.g., a removable cover sheet 16 having a flat surface can impart a flat surface onto the matrix 14, or a matte finish, or a pebbled finish, etc. Hence, the surface characteristics (e.g., visual improvement) of the matrix 14 can be influenced or dictated by the removable cover sheet 16 rather than the characteristics of the device (e.g., a platen or rollers) applying the pressure to the composite sheet material 10 during the lamination process. For example, an unexpected improvement was discovered when a two mil (i.e., 0.002 inches) cover sheet of biaxially oriented PET material was used during the present composite sheet material forming process. Upon removal of the cover sheet 16, a high quality, high gloss finish (similar to a "class A" surface finish) was discovered resulting from the use of the aforesaid cover sheet 16. The removable cover sheet 16 can also be used as a medium to transfer materials to the matrix 14. For example, the removable cover sheet can provide an effective mechanism for applying transfer print to the exterior surface 28 of the matrix 14. One of the advantages of applying transfer print via the removable cover sheet 16 is that it is easier to apply the transfer material to the cover sheet (e.g., via printing) than to a formed matrix 14 or formed composite material sheet 10. The cover sheet 16 can also be used as a protective cover.

In other embodiments, a cover sheet 16 may be permanently attached to the matrix 14, and consequently the composite sheet material 10, in a non-removable manner. The coversheet that is attached to the matrix 14, and thereby incorporated into the composite sheet material 10, can be used to provide desirable surface characteristics (e.g., a flat, textured, or embossed surface), printed or otherwise produced characters, designs, or graphics, or pigmentation, and/or a desirable surface finish (e.g., a flat non-gloss appearance, a high-gloss appearance, or anything in between). A bonding agent may be used to facilitate bonding of the cover sheet 16 to the underlying matrix 14. The bonding agent may be applied to one or both surfaces of the cover sheet and the matrix (or included as an additive as indicated above) that will be in contact with one another. The non-removable cover sheet 16 can be made from any of the cover sheet materials listed above. The cover sheet 16 may also include one or more additives, including those that function as ultraviolet (UV) inhibitors and thermal stabilizers, those that make the cover sheet 16 fire-resistant, and other additives such as pigments, PTFE and other fluoropolymers to improve stain resistance and cleanability, wetting agents, anti-microbial agents, anti-gas fade agents (e.g., chemical resistance agents), hydrophilic agents, and hydrophobic agents. The cover sheet 16 may also include one or more additives, including those that function as ultraviolet (UV) inhibitors and thermal stabilizers, those that make the composite sheet material 10 fire-resistant, and other various additives such as pigments, silicones, additives that improve stain resistance and cleanability (e.g., PTFE and other fluoropolymers), wetting agents, anti-microbial agents, anti-gas fade agents (e.g., chemical resistance agents), hydrophilic agents, hydrophobic agents. In those embodiments where the cover sheet 16 is extruded, the cover sheet 16 may also include process aids to improve extrusion surface uniformity. The cover sheet 16 may also include one or more of the following additives: biodegradable additives, grease resistant additives, antioxidant additives, slip agents, additives to minimize or eliminate static electricity, and conductive and/or semi-conductive particles or fibers. The characteristics (e.g., fire-resistance, UV inhibitors, etc.) of the various additives and components described above as potential constituents within the cover sheet 16, are not limited to the cover sheet 16, but may also be described as being a part of the composite sheet material 10 of which the cover sheet 16 is a portion.

In some embodiments, the composite sheet material 10 may include a backing layer 18 that is attached to the second face surface 22 of the substrate 12. The backing layer 18 may include a plurality of different materials. For example, the backing layer 18 may include a woven or nonwoven material; e.g. a non-woven material having a weight in the range of approximately 1.5 to 5.0 ounces per square yard. The present invention is not limited, however, to such a backing layer. A particularly desirable backing material is one that includes a spunlaced or needle punched non-woven material (e.g., PET, nylon, fiberglass, etc.), which spunlaced or needle punched non-woven material has omnidirectionally oriented fibers that help to provide omnidirectional strength characteristics that decrease the chance of delamination occurring; (e.g., fibers oriented in any of the X, Y, and Z axes, and combinations thereof; examples of the spunlaced and needle punched processes are described above). In alternative embodiments, the backing layer 18 may take the form of an apertured fabric (sometimes referred to as "perforated fabric"), which type of material is described above. An advantage of using an apertured nonwoven is that it can provide a superior bonding surface (to both exposed surfaces) due to additional surface area provided by the apertures. The backing layer 18 may also be formed using fibers that are pretreated, coated, or saturated with a binder to provide the backing layer 18 with desirable properties. Alternatively, the fibers within the nonwoven may be subsequently treated, coated or saturated with the binder to provide the aforesaid desirable properties. Non-limiting examples of such a binder include a polyurethane (e.g., BASF Astacin®), butadiene (e.g., BASF Luron®), or an acrylic that is a dispersion mainly of polyacrylic and polymethacrylic esters, usually produced by radical initiated emulsion polymerization of the unsaturated monomers (e.g., Celanese Emulsions Nacrylic® 217A, which is a self-crosslinking acrylic polymer emulsion, or Celvol 523) can be used to further enhance adhesion within and strength of the backing layer 18. The embodiments of the backing layer 18 that use a binder are not, however, limited to these examples. In some embodiments, the backing layer 18 may also be calendered to increase density and flatness, and/or to facilitate bonding of the fibers together to increase the resistance to delamination as well as improve adhesion to the second face surface 22 of the substrate 12. The backing layer can act as a mechanism for attaching the present composite sheet material 10 to structural materials such as wood, aluminum, steel, foam, composites, etc.

As indicated above, the matrix 14 and composite sheet material 10 may be formed using a variety of different manufacturing techniques.

Referring to FIG. 3, in a first example of a method for producing the present composite sheet material 10, the substrate 12 and matrix 14 can be produced independent of one another. The matrix 14 is formed by applying a multilayer coating of thermoplastic component 26 onto the support component 24 to form the matrix 14. The multiple layers of thermoplastic component 26 may be applied by a multilayer extrusion process, wherein each layer is extruded onto the support component 24. Each extruded layer of the thermoplastic component 26 may have the same or different characteristics (e.g., different layers having different melt points, etc.). One or more bonding agents may be disposed between the layers to facilitate relative attachment within the matrix 14, and also to facilitate attachment of the matrix 14 to the underlying substrate 12. The composite sheet material 10 can then be formed in the manner described above; e.g., using a continuous or batch-type thermo-pressure process where the processing temperature for the composite sheet material 10 is selected to be greater than the melting point of the thermoplastic component 26 of the matrix 14, but less than the melting point of the support component 24 of the matrix 14. In this embodiment, the layers of the thermoplastic component 26 are laminated together, and some amount of the one or more layers closest to the support component 24, or some portion of all the layers, will migrate through the support component 24 into contact with the substrate 12.

Figure 4:
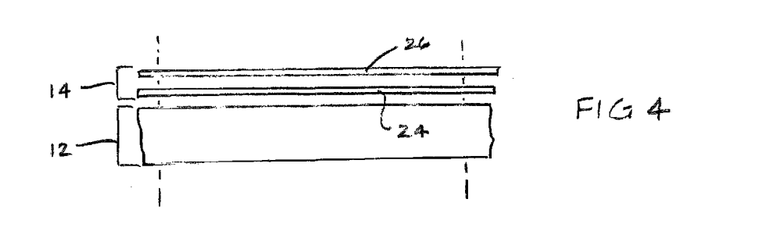
FIG. 4 is a diagrammatic exploded view of a stack up of the thermoplastic component, the support component, and the substrate of an embodiment of the present composite sheet material.

In a second example of a method for producing the present composite sheet material 10, the substrate 12 and matrix 14 can be produced independent of one another, with the substrate 12 formed as indicated above. In this example, the matrix 14 includes a thermoplastic component 26 in sheet form disposed on one side of the support component 24; e.g., also in sheet form. FIG. 4 shows a diagrammatic exploded view of the stack up of the thermoplastic component 26, the support component 24, and the substrate 12, prior to lamination to illustrate the relative positions. Depending upon the specific process, the thermoplastic component sheet 26 and the support component sheet 24 may be attached to one another to form the matrix 14 and to facilitate handling; e.g., attached using a thermo-pressure process, or adhesives, etc. The composite sheet material 10 can then be formed by attaching the matrix 14 to the substrate 12 using a continuous (e.g., roller-type dynamic process) or batch-type (e.g., platen-type static process) thermo-pressure process in which a surface of the support component 24 portion of the matrix 14 is disposed contiguous with the first face surface 20 of the substrate 12, and the stack up of the substrate 12 and component sheets 24,26 of the matrix 14 are subjected to an elevated pressure and temperature during the lamination process. As indicated above, the formation temperature of this second thermo-pressure bonding process is selected to be greater than the melting point of the thermoplastic component 26 of the matrix 14, but less than the melting point of the support component 24 of the matrix 14. The elevated temperature and pressure causes some amount of the thermoplastic material to melt and migrate and contact the first face surface 20 of the substrate 12, causing the matrix 14 to be attached to the substrate 12. As indicated above, a bonding agent may be disposed between the substrate 12 and the matrix 14 to facilitate the attachment of the matrix 14 on to the underlying substrate 12.

In a third example of the method for producing the present composite sheet material 10, the substrate 12 and matrix 14 may be produced independent of one another, with the substrate 12 formed as indicated above. In this example, the matrix 14 includes a multilayer thermoplastic component 26 in sheet form disposed on one side of the support component 24, which is also in sheet form. Each layer of the thermoplastic component 26 may have the same or different characteristics (e.g., different layers having different melt points, etc.). The multiple layers of thermoplastic component 26 may be adhered to one another to facilitate handling or they may be stacked relative to one another without being adhered to one another. The composite sheet material 10 can then be formed by attaching the matrix 14 to the substrate 12 in the manner described above; e.g., using a continuous or batch-type thermo-pressure process where the processing temperature for the composite sheet material 10 is selected to be greater than the melting point of the thermoplastic component 26 of the matrix 14, but less than the melting point of the support component 24 of the matrix 14. In the event a continuous thermo-pressure process is used to form the composite sheet material 10, the multiple layers of the thermoplastic component 26 may not be literally "stacked" prior to processing but rather may all be fed into the continuous type thermo-pressure processor to form the sheet material 10 at the beginning of the process line, or at defined positions along the processing axis of the processor. In similar fashion, other constituents of the composite sheet material (e.g., the substrate 12, a backing layer 18, etc) may also be fed into the continuous type thermo-pressure processor from the same or different positions along the processing axis of the processor. In these embodiments, the layers of the thermoplastic component 26 bond together during the lamination process, and some amount of the one or more layers closest to the support component 24, or some portion of all the layers, will migrate through the support component 24 into contact with the substrate 12.

Figure 5:
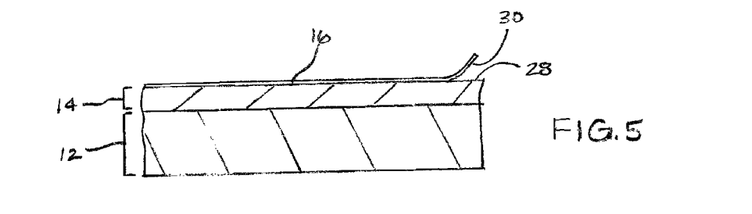
FIG. 5 is a diagrammatic view of an embodiment of the present composite sheet material, including a removable cover layer partially peeled away from the matrix.

Referring to FIG. 5, in a fourth example of a method for producing the present composite sheet material 10, the substrate 12 and matrix 14 are formed using any of the above described methods. In this example, a removable cover sheet 16 is disposed contiguous with the surface of the matrix 14 opposite the substrate 12; e.g., the stack up of composite sheet material 10 components includes substrate 12, support component 24, thermoplastic component 26, and cover sheet 16, in that order prior to formation of the composite sheet material 10 via the methods described above. During formation of the composite sheet material 10, the cover sheet 16 may be operable to impart surface characteristics to the matrix 14 and/or may be operable to transfer one or more materials to the exterior surface 28 of the matrix 14. In some embodiments, the removable cover sheet 16 is adhered to the matrix 14 in a manner that allows the cover sheet 16 to be maintained on the composite sheet material 10. After formation of the composite sheet material 10, the cover sheet 16 may be maintained on the composite sheet material 10 as a protective covering and can be readily removed upon use. FIG. 5 diagrammatic shows an edge of the cover sheet 16 peeled up to illustrate that it may be readily removed.

In a fifth example of a method for producing the present composite sheet material 10, the substrate 12 and matrix 14 are formed using any of the above described methods. In this example, a non-removable cover sheet 16 is disposed contiguous with the surface of the matrix 14 opposite the substrate 12; e.g., the stack up of composite sheet material 10 components includes substrate 12, support component 24, thermoplastic component 26, and cover sheet 16, in that order prior to formation of the composite sheet material 10. In some embodiments, a bonding agent operable to ensure bonding adhesion between the cover sheet 16 and the matrix 14 may be used. The composite sheet material 10 can then be formed using any of the methods described above.

Referring to FIG. 6, in a sixth example of a method for producing the present composite sheet material 10, the substrate 12 and matrix 14 are formed using any of the above described methods. In this example, the matrix 14 also includes a secondary thermoplastic component 27 that includes one or more sheets of a thermoplastic material that has a melting point equal to or greater than the support component 24. As indicated above, the secondary thermoplastic component 27 provides desirable properties that make the present composite sheet material 10 a favorable component for many different applications; e.g., desirable durability, formability, impact resistance, memory, and toughness. In this example, the stack up of the composite sheet material components includes a cover sheet 16 disposed contiguous with the surface of the matrix 14 opposite the substrate 12 (e.g., contiguous with the secondary thermoplastic component 27), the thermoplastic component 26, the support component 24, and the substrate 12, in that order prior to formation of the composite sheet material 10 via the methods described above. During formation of the composite sheet material 10, the thermoplastic component 26 within the matrix bonds with the secondary thermoplastic component 27, and migrates through the support component and bonds with the substrate 12.

The above examples of composite sheet materials 10 according to the present invention are provided to illustrate specific embodiments of the present invention composite sheet materials 10. The present composite sheet material is not limited to these examples however.

One of the advantages of the present composite sheet material 10 is that the it avoids appearance issues associated with the substrate 10 and thereby increases the number of possible uses for the product. The constituents within the substrate 10 can give the substrate 10 an undesirable rough surface; i.e., a surface with a poor level of flatness. The matrix 14 of the present composite sheet material acts as a veil that prevents the rough surface or patterns or undesirable blemishes of the substrate 10 from telegraphing through to the exposed surface of the composite sheet material. As a result, the surface characteristics of the composite sheet material are dictated by the matrix 14, and not by the substrate 10. In addition, the matrix 14 can be formulated to provide other significant functions; e.g., environmental protections including anti-microbial, fire-resistance, chemical resistance, UV light inhibition, abrasion/scratch resistance, cleanability, and others, as well as decorative or informational colors, printing, etc.

The above described composite sheet material 10 can be formed to have a multi-directional grain structure that has desirable physical and mechanical properties and economic advantages versus competing technologies such as thermoset FRP, steel, aluminum, plywood, etc. The composite structure can be formed in several different configurations and thicknesses to suit a large variety of applications. The thickness of the composite structure is typically a function of the number of layers foaming the material. Composite structures utilizing the present composite sheet material 10 can be used, for example, in transportation applications to make cargo containers, walls, ceilings, doors, roofing, sub-pan liners, and scuff liners in tractor trailers, dry-freight or refrigerated. In addition, composite structures utilizing the present composite sheet material 10 are very well suited for use as an transportation aerodynamic improver, such as a side skirt disposed underneath a tractor-trailer body. The composite structures utilizing the present composite sheet material 10 as an exterior layer have excellent durability and impact resistance, and stand up well to fork-lift abuse, shifting cargo, and other abuse, and allow fleets to reduce operating costs in both materials requirements and downtime resulting from interior damage. The present composite sheet material 10 can also be used in building material applications; e.g., walls, panels, ceilings, etc.

The following application examples illustrate the utility of the present composite sheet material. As a first example, a pair of side skirt assemblies incorporating the present composite sheet material 10 may be configured for attachment under a tractor trailer, between the wheels of the truck tractor and the wheels of the tractor trailer. The side skirt assemblies may be configured to have a length, a width, a thickness, and may be attached to a support frame. The support frame may be bonded or otherwise attached to the side of the substrate 12 opposite the side attached to the matrix 14, or attached to backing layer 18 which is bonded or otherwise attached to the side of the substrate 12 opposite the side attached to the matrix 14. Examples of support frames (e.g., struts) are disclosed in U.S. Pat. Nos. 7,887,120 and 7,942,469, each of which is hereby incorporated by reference in its entirety into the present application. The support frame may be used to mount the side skirt assembly onto the tractor trailer. The side skirt assemblies are typically attached and oriented so that the width of each side skirt assembly is substantially vertically positioned on each side of the road trailer 20, and the length of the side skirt assemblies extend along the length of the tractor trailer. The side skirt assemblies divert air around the tractor trailer and reduce the air drag created by the tractor trailer during operation. As indicated above, the present composite sheet material 10 is operable to be printed on, or otherwise decorated; e.g., advertisements, logos, etc. Additional examples of the utility of the present composite sheet material 10 include applications wherein the composite sheet material 10 is configured to be used as one or more of the walls, ceiling, doors, and roofing of a tractor trailer having an enclosed box style container, or scuff liners attached to the walls or ceilings of the box container, or wall or ceiling surfaces within public transportation vehicle such as a bus, train, or airplane, etc. In these applications, panels formed from the present composite sheet material may be attached to a frame defining the box container, or vehicle interior or exterior. The above examples are illustrative of the uses of the present composite sheet material, but are not intended to limit the applications in which the composite sheet material 10 may be used.

Although this invention has been shown and described with respect to the detailed embodiments thereof, it will be understood by those skilled in the art that various changes in form and detail thereof may be made without departing from the spirit and the scope of the invention. For example, the present composite material substrate and method for forming the same is described herein in terms of various embodiments including different elements or manufacturing steps. The identified embodiments, elements, and steps may be utilized singularly or in combination with any of the other embodiments, elements, and steps. In addition, it should be noted that FIGS. 1-6 are drawn to diagrammatically illustrate aspects of the present invention, and are not necessarily drawn to scale.

What is claimed is:

1. A composite sheet material, comprising:
    a substrate having a first face surface, a second face surface, and a plurality of edges;
    a support layer having a support layer material that has a first melting point;
    a thermoplastic layer having a thermoplastic layer material that has a second melting point less than the first melting point; and
    a cover sheet that imparts one or more surface characteristics to the composite sheet material during thermo-pressure formation of the composite sheet material, wherein
    the thermoplastic layer is adjacent to the support layer,
    the thermoplastic layer is migrated into the support layer,
    the thermoplastic layer and the support layer together provide a laminate,
    a percentage amount of the thermoplastic layer material at a first side of the laminate is greater than a percentage amount of the thermoplastic layer material at a second, opposing side of the laminate,
    the thermoplastic layer includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

2. The composite sheet material of claim 1, wherein the cover sheet is adhered to the laminate in a manner that allows removal of the cover sheet from the laminate.

3. The composite sheet of claim 2, wherein
the cover sheet includes a paper material having a cellulosic material, and
the cover sheet is treated with a material that impedes bonding of the cover sheet to the laminate.

4. The composite sheet material of claim 2, wherein the coversheet includes one or more polymeric materials selected from the group consisting of polyphenylsulfone, polyphenylsulfide, polyurethane, polyethylene, low-density polyethylene, polyamide, polyamide-imide, ionomer, polycarbonate, polyethylene terephthalate, polybutylene terephthalate, fluoropolymers, combinations thereof, and co-polymers thereof.

5. The composite sheet material of claim 1, wherein the cover sheet is permanently bonded to the laminate of the composite sheet material.

6. The composite sheet material of claim 5, wherein the coversheet includes one or more polymeric materials selected from the group consisting of polyamide, polyphenylsulfone, polyphenylsulfide, polyurethane, polyethylene, low-density polyethylene, polyamide, polyamide-imide, ionomer, polycarbonate, polyethylene terephthalate, polybutylene terephthalate, fluoropolymers, combinations thereof, and co-polymers thereof.

7. The composite sheet material of claim 1, wherein the thermoplastic layer includes a plurality of layers.

8. The composite sheet material of claim 7, wherein the plurality of layers includes a first layer of a first material and a second layer of a second material different from the first material.

9. The composite sheet material of claim 1, wherein the support layer material is a spun lace non-woven.

10. The composite sheet material of claim 1, wherein the substrate includes multiple layers.

11. The composite material of claim 10, wherein the substrate includes one or more agents selected from the group consisting of ultraviolet (UV) inhibitors, thermal stabilizers, fire-resistant agents, pigments, wetting agents, anti-microbial agents, hydrophilic agents, hydrophobic agents, biodegradable agents, grease resistant agents, antioxidant agents, slip agents, agents to reduce or eliminate static electricity, and at least semi-conductive particles or fibers.

12. The composite material of claim 1, further comprising a backing layer attached to the second face surface of the substrate, wherein
the laminate is attached to the first face surface of the substrate.

13. The composite material of claim 12, wherein the backing layer includes a nonwoven material having omnidirectionally oriented fibers.

14. The composite material of claim 12, wherein the backing layer is a needle-punched or spun-laced nonwoven material.

15. The composite sheet material of claim 1, wherein the thermoplastic layer is migrated from the first side of the laminate through to the second side of the laminate.

16. A method of forming a composite sheet material, comprising:

providing a substrate having a first face surface, a second face surface, and a plurality of edges;
forming a laminate from a support layer and a thermoplastic layer, wherein the support layer has a support layer material having a first melting point, and the thermoplastic layer has thermoplastic layer material having a second melting point less than the first melting point;
positioning the substrate and the laminate such that the laminate is contiguous with the first face surface of the substrate; and
laminating the substrate and laminate together in a thermo-pressure process to form the composite sheet material, wherein
after the laminating, the thermoplastic layer is migrated into the support layer, and a percentage amount of the thermoplastic layer material at a first side of the laminate is greater than a percentage amount of the thermoplastic layer material at a second, opposing side of the laminate,
the thermoplastic layer includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and
the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

17. The method of claim 16, further comprising:
providing a cover sheet that imparts one or more surface characteristics to the composite sheet material during thermo-pressure formation of the composite sheet material; and
positioning the cover sheet on a side of the laminate that is opposite the side contiguous with the substrate; and
subjecting the cover sheet to the thermo-pressure process within the laminating step.

18. The method of claim 17, wherein after lamination the cover sheet is adhered to the laminate in a manner that allows removal of the cover sheet from the laminate.

19. The method of claim 18, wherein
the cover sheet includes a paper material having a cellulosic material, and
the cover sheet is treated with a material that impedes bonding of the cover sheet to the laminate.

20. The method of claim 17, wherein the laminating step causes the cover sheet to be permanently bonded to the laminate.

21. The method of claim 20, wherein the coversheet includes one or more polymeric materials selected from the group consisting of polyamide, polyphenylsulfone, polyphenylsulfide, polyurethane, polyethylene, low-density polyethylene, polyamide, polyamide-imide, ionomer, polycarbonate, polyethylene terephthalate, polybutylene terephthalate, fluoropolymers, combinations thereof and co-polymers thereof.

22. The method of claim 16, wherein the thermoplastic layer includes a plurality of layers.

23. The method of claim 22, wherein the plurality of layers includes a first layer of a first material and a second layer of a second material different from the first material.

24. The method of claim 16, wherein the support layer material is a spun lace non-woven.

25. A method of forming a composite sheet material, comprising:

providing a substrate having a first face surface, a second face surface, and a plurality of edges;

forming a laminate by extruding a multilayer thermoplastic onto a support layer, wherein the support layer has a support layer material having a first melting point and the multilayer thermoplastic has a thermoplastic layer material having a second melting point less than the first melting point;

positioning the substrate and the laminate such that the laminate is contiguous with the first face surface of the substrate; and laminating the substrate and laminate together in a thermo-pressure process to form the composite sheet material, wherein after the laminating, the multilayer thermoplastic is migrated into the support layer, and a percentage amount of the thermoplastic layer material at a first side of the laminate is greater than a percentage amount of the thermoplastic layer material at a second, opposing side of the laminate, the multilayer thermoplastic includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

26. The method of claim 25, further comprising:

providing a cover sheet that imparts one or more surface characteristics to the composite sheet material during thermo-pressure formation of the composite sheet material; and positioning the cover sheet on a side of the laminate that is opposite the side contiguous with the substrate; and subjecting the cover sheet to the thermo-pressure process within the laminating step.

27. The method of claim 26, wherein after lamination the cover sheet is adhered to the laminate in a manner that allows removal of the cover sheet from the laminate.

28. The method of claim 26, wherein the laminating step causes the cover sheet to be permanently bonded to the laminate.

29. A composite sheet material matrix, comprising:

a support layer having a support layer material that has a first melting point; and a multilayer thermoplastic having a thermoplastic layer material that has a second melting point less than the first melting point, wherein the multilayer thermoplastic is adjacent to the support layer, the multilayer thermoplastic is migrated into the support layer, the multilayer thermoplastic and the support layer together provide a laminate, a percentage amount of the thermoplastic layer material at a first side of the laminate is greater than a percentage amount of the thermoplastic layer material at a second, opposing side of the laminate, the multilayer thermoplastic includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

30. The composite sheet material matrix of claim 26, wherein the multilayer thermoplastic includes a first layer of a first material and a second layer of a second material different from the first material.

31. A composite sheet material, comprising:

a substrate having a first face surface, a second face surface, and a plurality of edges;

a support layer having a support layer material that has a first melting point;

a thermoplastic layer having a thermoplastic layer material that has a second melting point less than the first melting point; and a secondary thermoplastic layer having a second thermoplastic layer material that has a third melting point that is equal to or greater than the first melting point, wherein the thermoplastic layer or the secondary thermoplastic layer is adjacent to the support layer, the thermoplastic layer or the secondary thermoplastic layer is migrated into the support layer, the thermoplastic layer, the secondary thermoplastic layer and the support layer together provide a laminate, a percentage amount of the thermoplastic layer material or the second thermoplastic layer material at a first side of the laminate is greater than a percentage amount of the thermoplastic layer material or the second thermoplastic layer material at a second, opposing side of the laminate, the thermoplastic layer or the secondary thermoplastic layer includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

32. A side skirt assembly adapted to be mounted to a tractor trailer, comprising:

a support frame configured to attach to the tractor trailer; and a side skirt panel attached to the support frame, wherein the side skirt panel is a composite sheet material that has a length and a width, the composite sheet material includes a substrate, a support layer, a thermoplastic layer, and a cover sheet, the support layer has a support component material having a first melting point, the thermoplastic layer has a thermoplastic layer material having a second melting point less than the first melting point, the thermoplastic layer is adjacent to the support layer, the thermoplastic layer is migrated into the support layer, the thermoplastic layer and the support layer together provide a laminate, the laminate is attached to the substrate, a percentage amount of the thermoplastic layer material at a first side of the laminate is greater than a percentage amount of the thermoplastic layer material at a second, opposing side of the laminate, the cover sheet is configured to impart one or more surface characteristics to the composite sheet material during a thermo-pressure formation of the composite sheet material, the thermoplastic layer includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

33. A panel for a tractor trailer box container having a frame, comprising:

a composite sheet material panel that has a length and a width and is configured for attachment to the frame of the tractor trailer box container frame, the composite sheet material panel including:

a substrate, a support layer, a thermoplastic layer, and a cover sheet, the support layer includes a support layer material having a first melting point, the thermoplastic layer includes a thermoplastic layer material having a second melting point less than the first melting point, the thermoplastic layer is adjacent to the support layer, the thermoplastic layer is migrated into the support layer, the thermoplastic layer and the support layer together provide a laminate, the laminate is attached to the substrate, a percentage amount of the thermoplastic layer material at a first side of the laminate is greater than a percentage amount of the thermoplastic layer material at a second, opposing side of the laminate, the cover sheet is configured to impart one or more surface characteristics to the composite sheet material during a thermo-pressure formation of the composite sheet material, the thermoplastic layer includes one or more polymeric materials selected from the group consisting of polypropylene, polyethylene, polyethylene terephthalate, low-density polyethylene, polyurethane, polyamide, polyamide-imide, ionomer, acrylic, combinations thereof, and co-polymers thereof, and the support layer includes one or more materials selected from the group consisting of polyester, polyamide, polyphenylsulfide, aromatic polyamide, fiberglass, polytetrafluoroethylene, wool, alumina, silica, polyimide, cellulose, rayon, viscose, and combinations thereof.

* * * * *

UNITED STATES PATENT AND TRADEMARK OFFICE
CERTIFICATE OF CORRECTION

Page 1 of 1

PATENT NO. : 9,138,943 B2
APPLICATION NO. : 13/605598
DATED : September 22, 2015
INVENTOR(S) : Martin Weinberg, James Yuan and Robert Markowski It is certified that error appears in the above-identified patent and that said Letters Patent is hereby corrected as shown below:

In the claims

Column 18, line 8, claim 30, after "matrix of claim"; delete "26"; insert -- 29 --.

Signed and Sealed this
Twenty-third Day of February, 2016

Michelle K. Lee
*Director of the United States Patent and Trademark Office*